United States Patent
Roelens

(10) Patent No.: US 9,556,556 B2
(45) Date of Patent: Jan. 31, 2017

(54) METHOD FOR MANUFACTURING PILE CARPET

(75) Inventor: Geert Roelens, Lauwe (BE)

(73) Assignee: CTTEC BVBA (BE)

( * ) Notice: Subject to any disclaimer, the term of this patent is extended or adjusted under 35 U.S.C. 154(b) by 273 days.

(21) Appl. No.: 14/241,036

(22) PCT Filed: Mar. 8, 2012

(86) PCT No.: PCT/BE2012/000012
§ 371 (c)(1),
(2), (4) Date: Feb. 25, 2014

(87) PCT Pub. No.: WO2013/029121
PCT Pub. Date: Mar. 7, 2013

(65) Prior Publication Data
US 2014/0205788 A1 Jul. 24, 2014

(30) Foreign Application Priority Data

Aug. 26, 2011 (BE) .................................. 2011/0510

(51) Int. Cl.
*D05C 15/18* (2006.01)
*D06N 7/00* (2006.01)
(Continued)

(52) U.S. Cl.
CPC ............ *D06N 7/0065* (2013.01); *D04H 11/04* (2013.01); *D05C 15/18* (2013.01); *B32B 2471/02* (2013.01);
(Continued)

(58) Field of Classification Search
CPC .................... D06N 7/0065; Y10T 428/23957; Y10T 428/23979; D05C 15/18; D05C 15/08; D05C 17/02; B32B 2471/02
(Continued)

(56) References Cited

U.S. PATENT DOCUMENTS 3,173,823 A * 3/1965 Guinard ................. D04H 11/04
156/309.6
3,565,710 A * 2/1971 Garvin ................... D05C 15/00
156/435
(Continued)

FOREIGN PATENT DOCUMENTS

BE     EP 0943715 A1 * 9/1999 ............. D04H 11/00
EP     0402664 A1    12/1990
GB     1454443 A     11/1976

OTHER PUBLICATIONS

International Search Report and Written Opinion mailed Jun. 8, 2012 (PCT/BE2012/000012); ISA/EP.
(Continued)

*Primary Examiner* — Cheryl Juska
(74) *Attorney, Agent, or Firm* — Banner & Witcoff, Ltd.

(57) ABSTRACT

The invention relates to a method for manufacturing pile carpet or pile carpet tiles, wherein a pile yarn (8) is connected via a pile thread holder (1) to at least a primary backing (7), wherein the pile thread holder (1) comprises a plurality of pile thread guide channels (2) which perforate the pile thread holder (1) through two opposite sides, wherein the pile thread holder (1) is provided between a pile thread gripping station (14) on a first perforated side (5) and a primary backing (7) on a second perforated side (6) such that the pile yarn (8) is arranged via the first perforated side (5) through a pile thread guide channel (2) to the second perforated side (6) onto, into or through the backing (7).

19 Claims, 2 Drawing Sheets

Figure 1:
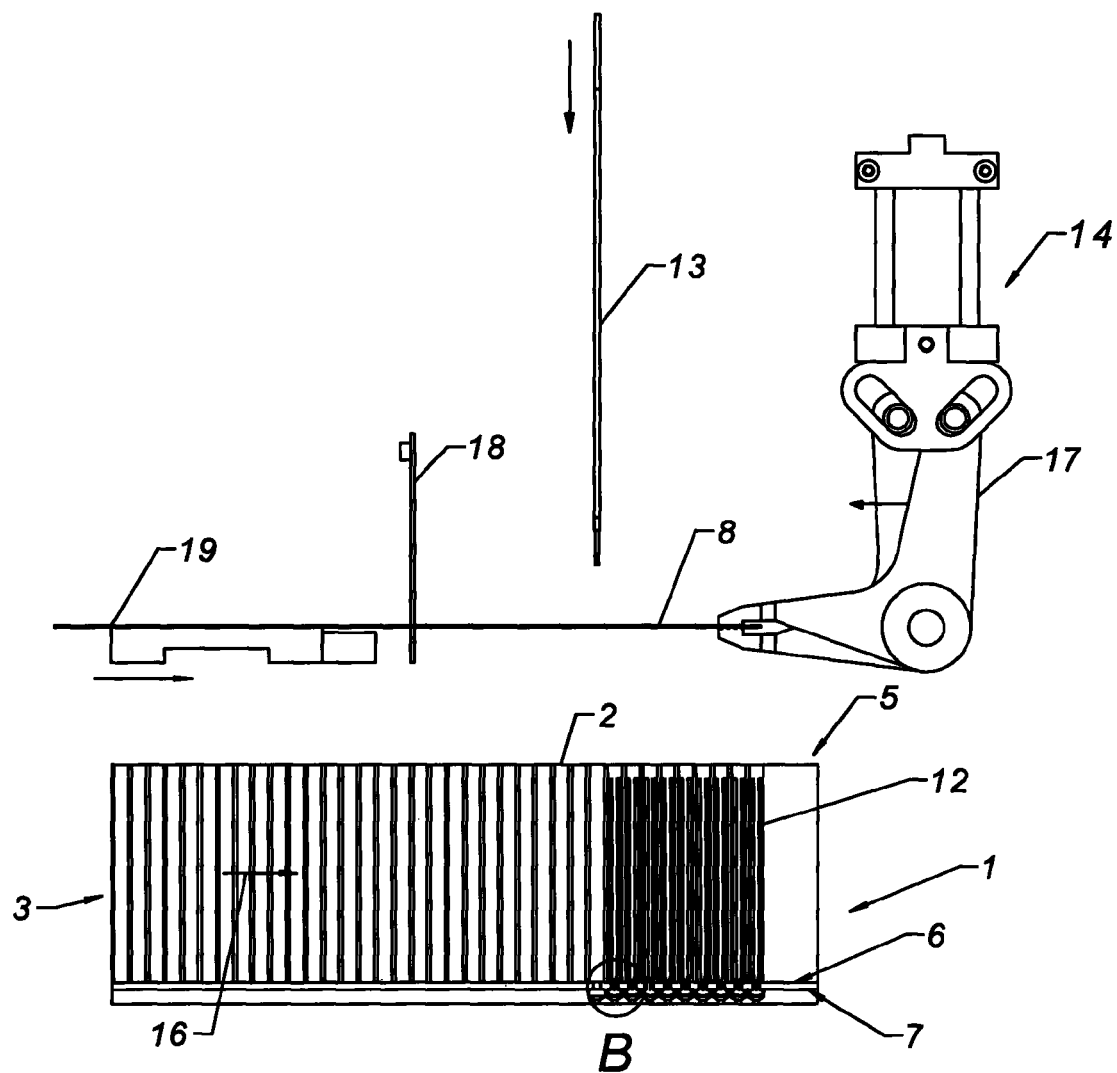

(51) Int. Cl.
*D04H 11/04* (2006.01)
*D05C 17/02* (2006.01)

(52) U.S. Cl.
CPC ........ *D05C 17/02* (2013.01); *Y10T 428/23979* (2015.04)

(58) Field of Classification Search
USPC ............................ 156/72; 428/95, 92; 28/159
See application file for complete search history.

(56) References Cited

U.S. PATENT DOCUMENTS

| | | | | |
|---|---|---|---|---|
| 3,640,786 A | * | 2/1972 | Carpenter | B29C 65/08 156/178 |
| 3,756,173 A | * | 9/1973 | Shorrock | D05C 15/20 112/475.23 |
| 3,840,413 A | * | 10/1974 | Bylund | D04H 11/00 156/265 |
| 3,856,597 A | | 12/1974 | Campman | |
| 3,937,643 A | * | 2/1976 | Spanel | D05C 15/00 156/435 |
| 4,087,311 A | * | 5/1978 | Bylund | D04H 11/00 156/511 |
| 4,201,608 A | | 5/1980 | Currell | |
| 4,678,533 A | * | 7/1987 | Bartlett | B65H 51/16 112/80.07 |
| 4,931,129 A | * | 6/1990 | Bartlett | B65H 51/16 112/80.7 |
| 5,135,602 A | | 8/1992 | Wild | |

OTHER PUBLICATIONS

IPRP Chapter II mailed Nov. 13, 2013 (PCT/BE2012/000012); ISA/EP.

* cited by examiner

METHOD FOR MANUFACTURING PILE CARPET

The present application is a U.S. National Phase filing of International Application No. PCT/BE2012/000012, filed on Mar. 8, 2012, designating the United States of America and claiming priority to and the benefit of BE 2011/0510, filed Aug. 26, 2011. The present application claims priority to and the benefit of the above-identified applications, and the above-identified applications are incorporated by reference herein in their entirety.

TECHNICAL FIELD

The invention relates to an improved method for manufacturing pile carpet, having particularly an advantageous application for cut-pile carpet tiles, more specifically in V-pile. The invention relates particularly to a continuous single-step process from backing to finished carpet or carpet tile. The invention also relates to the pile carpet, and in particular the pile carpet tiles manufactured with this method. The invention further relates to a device for performing such a method.

BACKGROUND

The invention is particularly suitable for cut-pile carpet. Cut-pile carpet is characterized by a surface formed by standing pile threads in the form of (cut) thread ends which are connected to a carrier (or backing) mechanically or by means of adhesives.

Carpet tiles are typically manufactured by cutting wide carpet on a roll.

Classical production techniques include tufting and weaving.

In tufting the pile loops are formed by way of a "needle-hook" system. A hook holds the yarn fast once the needle has punched the yarn through a woven or non-woven carrier (primary backing). The thus formed loops can optionally be cut with a knife. A loop-pile carpet or a cut-pile carpet is thus created. In order to prevent the pile threads from being easily pulled out, an additional treatment process after the tufting will adhere the pile threads to the rear side of the carrier using an adhesive. An additional carrier (secondary backing) is then arranged in order to increase the comfort of a tufted carpet.

Drawbacks of tufting are: (1) different operations are necessary after the tufting for the purpose of anchoring the pile yarns and improving the comfort; (2) the limitation of the carrier material used; (3) very limited patterning options because the yarn has to remain in the needle during the tufting. Special techniques (cross-over technique) for improving the patterning then have a very adverse effect on the consumption of pile yarn; (4) there is a "pile direction" corresponding to the production direction; (5) tufting is very susceptible to stripe forming; (6) different layers are necessary in the backing in order to obtain stability (different materials are moreover particularly necessary for manufacturing tiles, which makes recycling of carpet tiles very difficult); and (7) very large "latexing ovens" which eat up energy are necessary for drying and curing the backings.

Characteristic for weaving is the use of warp yarns, weft yarns as well as pile yarns. During the weaving process both the "pile" and the "bottom cloth" of the woven carpet are formed. The pile yarns are anchored by warp yarns and weft yarns being woven into the bottom cloth. Before (axminster technique) or immediately after (face-to-face and wilton techniques) the pile yarns are woven in, the pile material is cut to length, whereby a cut-pile carpet is formed. Following weaving the reverse side of the woven carpet is treated with an additional finish.

In "face-to-face weaving" two carpets which are connected together with the pile threads are woven at the same time. The "non-active" invisible pile threads are woven into the reverse side. The "active" pile threads which connect the two carpets together are then cut with a knife.

In "wilton carpet" the carpet pile is formed by means of metal wires which also determine the pile height. The thus formed loops are woven into the bottom cloth. The woven-in pile loops can optionally be cut, thereby resulting in a cut-pile or loop-pile carpet.

In "axminster carpet" the pile yarns to be woven in are first cut to length and then woven in, whereby they have fewer pile yarns on the rear side of the carpet.

Drawbacks of weaving are: (1) slow production process which causes heavy vibrations (machines have to be built on vibration-free concrete bases); (2) very large and expensive machines; (3) high loss of pile yarns due to the fact that non-active threads (colours) continue to run and are woven into the "back" (underside) of the carpet; (4) there is a pile direction corresponding to the production direction; (5) extra operation to finish the back (pile anchoring) in large latexing ovens which eat up energy; (6) carpets still have to be cut and hemmed to prevent fraying of the edges; (7) a plurality of raw materials in one carpet and particularly the latex for anchoring the pile results in difficult and incomplete recycling; and (8) complicated and not very flexible planning, with loss of bottom cloth, in planning of loose-laid carpet on the four meter-wide machines. The dimensions of loose-laid carpet are also standardized, resulting in a limited supply.

The closest prior art, of which the present invention is also a further development, is EP 0943715 (of Inventor). EP 0943715 describes a yarn-drum applicator used as cylindrical pile thread holder. A primary backing comes to lie against the outer side of the drum applicator. The pile thread holder comprises a plurality of pile thread guide channels perforated on the outer side of the pile thread holder in a matrix pattern. Pile threads are inserted via the outer side of the drum applicator and right through the backing so as to thus form the pile yarn of the pile carpet, wherein the pile ends are protected by the pile guide channels. The part of the pile yarn which has to be fixed in J-Shape to the backing protrudes on the outer side.

Since the backing lies around the drum on the outer side of the cylindrical wall and the pile threads are also introduced from outside, all pile yarns must pass wholly through the backing in order to be carried into the guide channels of the pile thread holder. This can often cause damage to the pile yarn.

A problem is that for the purpose of obtaining a cut-pile carpet only a single thread can be inserted so as to be finally fixed in J-shape between two backings. Arranging V-pile is all the more difficult, if not impossible with this method. The two V-ends have to be arranged here through the backing and into the pile guide channels. This is only possible if the V-pile were to be inserted in reverse direction, wherein the tip of the V-pile is partially sheared afterwards. Furthermore, the chance of damage to the pile yarn is then even greater.

SUMMARY

In order to obviate this problem it is therefore an object of the present invention to prevent damage to pile yarn in a cut-pile carpet and to improve the ease of insertion of the pile yarn compared to EP 0943715. It is a specific object of an embodiment of the present invention to manufacture a V-pile carpet. A significant additional advantage is that the pile density is greatly increased.

It is therefore a general object of embodiments of the invention to manufacture a cut-pile carpet, loose-laid or wall-to-wall, preferably formed from preferably washable and recyclable tiles, made with an energy friendly single-step process with savings of raw materials and space, and to be modulated according to the wishes of the consumer. In other words, not restricted to standard dimensions associated with machine widths as in tufting and weaving. The special technique described in embodiments of the invention and the method of manufacture on small, flexible machines at tile width make it possible to achieve the following, which cannot be achieved with known production processes: carpets with invisible seams can be formed with this type of carpet tile. The seams between the tiles are invisible because: (1) no pile yarn is damaged because subsequent cutting is unnecessary, (2) because the edges can be given a perfect finished up to the pile yarns and cannot fray, (3) because there is no pile direction. These carpets in tile form, made on small, flexible machines and in a single-step process, also have numerous logistical advantages, both during manufacture and in laying of the carpet. There are no inconvenient rolls, as in the case of tufted or woven carpet, which are difficult to move via stairs or lift or in the boot of a vehicle. The tiles can be made fully recyclable with this technique due to the wider choice of usable raw materials and are moreover washable in a normal domestic washing machine. This special technique of pile yarn insertion also enables patterning without pointless yarn loss on the underside of the carpet. Yarn losses and change-over times are also much more limited owing to these smaller, flexible machines. It is moreover not only possible to create patterns with yarn colours and yarn types, but it is also possible to create three-dimensional patterns by inserting different pile heights in the same carpet tile or distributed over different carpet tiles which can be laid in the correct sequence in accordance with the pattern. Because use is not made of larger rolls a tile can moreover be made in any possible shape (for instance also round, triangular, polygonal, puzzle-piece shapes, random shapes, use-specific shapes such as car mats, etc.). The use of for instance a pressure sensitive adhesive or a technique for connecting the tiles to each other enables quick and easy placing and repeated rearrangement of the tiles in other forms and/or structures by anyone. Nor does wall-to-wall carpet require specialist carpet fitters.

In order to achieve one or more of these objectives an embodiment of a device of the invention comprises substantially a pile thread holder, wherein a plurality of pile thread guide channels perforate both sides of the pile thread holder. A (primary) backing is arranged against the one (lower) side of the pile thread holder. Provided on the other (upper) side of the pile thread holder is a gripping station which pushes the pile threads through the pile thread guide channels from above (or pulls them from below) so that they are finally arranged on, in or through the backing.

In contrast to the method in EP 0943715, the pile thread can now first be inserted into the pile thread holder and only then pass through the backing.

The pile thread holder is preferably flat. The pile threads are preferably inserted in V-shape, wherein the tip of the V-shape preferably passes through the backing and the two free outer ends form the pile yarn. A cut-pile carpet or pile carpet tile is obtained here, whereby the pile density and/or the production speed is double that with a J-pile. For special applications of this technique, such as for instance brushes, a non-flat pile thread holder may sometimes be advantageous.

The advantage of such a method of insertion is that only that portion of the pile yarn which has to be attached to the backing has to pass through the backing. It is thereby no longer necessary for the pile portion of the yarn to pass through the backing, so eliminating the risk of damage.

A significant advantage of an embodiment of the method is the easy arrangement of V-pile on a backing, since only the tip of the V-shape (attaching part of the pile yarn) has to be guided through the backing. The V-ends are safely secured in the pile thread guide channels without first having to pass through a backing.

A further additional advantage of an embodiment of the method of the invention compared to EP 0943715 is the fact that both sides of the pile thread holder are better accessible, so that a gripping pin can come from both sides. The combination of two gripping pins also makes it possible to manufacture very short pile carpets with this technique.

Embodiments of the invention are particularly advantageous due to the fact that they combine the advantages of weaving (patterning) and tufting (production speed). The patterning moreover does not entail yarn losses on the underside of the carpet, as in weaving, and it is also possible to create 3-D patterns with variations in pile height on the same carpet tile. The standing pile realizes a more resilient carpet, resulting once again in a saving of yarns. Owing to these yarn savings and the types of backing possible with this system, this production method produces a stable carpet tile containing up to half the raw materials of a carpet tile made in accordance with the existing techniques. It is possible with this technique to manufacture both the pile yarn and the backing from the same flexible material, whereby the carpet tile is washable and fully recyclable, and preferably without separation of materials. A loop-pile carpet is also possible in addition to the cut-pile carpet.

The perfect finish of the edges of the tiles (does not fray) makes it possible to manufacture carpet tiles on small, flexible production machines, wherein the tiles can be used for fitted carpet or loose-laid carpet without visible seams or also in combination with other fixed floor covering materials such as wood, stone, other carpet tiles or other materials.

Embodiments of the method of the present invention have further advantages:

Use is made in EP 0943715 of a drum-applicator four or five meters wide, as in the classical production methods such as weaving and tufting. The present invention is however preferably intended for smaller, flexible machines for making carpet tiles in one production step.

The machines for making the carpet tiles are preferably constructed in modular form from diverse components in order to enable easy change in production. The machine comprises at least one gripping station and can be expanded with additional gripping stations in order to enable more rapid production or enable production of additional colours or pile heights within the single-step process. The diverse components preferably have standardized dimensioning. The components can be mutually connected so as to form one entity and enable transport of the pile thread holders between the components. In addition, the necessary couplings are made in order to ensure a central control of the individual functions of the components.

The accuracy of the position of the guide channels opposite the gripping pin can be better guaranteed: expansion due to temperature difference has less effect on a small width than on a large width.

The carpet tiles can be manufactured in precut form, whereby the pile yarns are not cut at the edge of the tile. Later cutting to size is hereby no longer required, so that no additional differences in tension can occur after the cutting of threads of fibres, and the pile yarn is not damaged in this way at the edges.

There is a better flatness of the finished final product.

The backing perforations for the pile yarn can be made considerably smaller, to a dimension and/or shape wherein the pile yarns are fixed much more firmly. The fixation part of the pile yarn which comes to lie between the backings can hereby be limited still further in order to prevent yarn costs.

In determined types of backing material pre-perforation may be unnecessary. This is possible for instance when the yarns remain in place without problem when the backing is pierced with the gripping pin.

In contrast to the existing technologies such as weaving and tufting, where long drying and curing ovens are necessary at high temperature in order to arrange a backing and/or anchor the pile yarn to the carrier, in the present invention the pile is preferably anchored under high pressure (claim 4). The yarn is protected in the pile thread holder, whereby it cannot be damaged and whereby the surface of the backing through which the pile yarns pass (primary backing) remains perfectly flat. It is thus possible without risk on this small surface area (tile size) to press very hard on this primary backing at a determined temperature and for a determined time. The preferably protruding outer ends (on backing side) of the pile yarns are in this way compressed, preferably between a primary and a secondary backing. The two backings are in this manner fused and/or glued together. The outer ends of the pile yarns pressed between the backings are in this way anchored mechanically (optionally also thermally or chemically). Depending on the melting point of the yarns used, they can also be optionally partially fused between the backings.

According to an embodiment of the method of the present invention, a pile thread is gripped in the middle section of the thread using a gripping and/or pusher element (gripping pin) which carries the pile yarn first through the thread guide channel and then through the perforation of the primary backing. The middle section which passes through the backing then forms the "fixation part" of the yarn which will be fixed to the backing(s). The two outer ends of the pile yarn then form the pile tips (cut-pile). When the fixation part lies perfectly in the centre of the inserted pile thread in V-shape, the pile tips extend equally high. It is also possible to remove this fixation part from the centre so that the pile tips extend to different heights.

For very short pile threads it may be necessary to grip the pile thread between two gripping pins. Another gripping pin then comes from the other side of the pile thread holder.

It has been determined that this method of fixing (V-pile) is better (with better fixed pile) than fixing a thread end (J-pile). The fixation part in V-pile forms a kind of flange during pressing, whereby a very good pile fixing is obtained.

If a higher pile density is desired, two or more threads can be carried through the same thread guide channel.

The pile yarn is preferably cut to the desired length during guiding through the thread guide channel. The yarn can already be situated partially in the thread guide channel and positioned without pulling force on the yarn so that there is preferably low to no thread tension during cutting. Cutting at a low thread tension achieves a more compact and attractive pile tip so that shearing of the carpet (as after weaving and tufting) is unnecessary.

The length of the pile yarn, once it has passed through the backing, is preferably equal to or shorter than the length of the thread guide channels so that the pile tips are fully protected in the pile thread holder. The pile length of the cut-pile carpet is then equal to or shorter than the length of the thread guide channels. With this system use can be made for special applications of very long thread guide channels for extremely long pile yarn, which cannot be achieved with classical tufting and weaving techniques. Examples of possible new applications can be: artificial grass for grass verges which may or may not be further sown, special brushes with long bristles, insulation panels, acoustic insulation, industrial filters or a type of artificial seaweed on the seabed for the purpose of enhancing the fish population (breeding areas).

In an advantageous embodiment a thread gripper system is provided for each thread guide channel of a row in the matrix pattern of the pile thread holder. All gripper systems of this whole row are collected in a gripper station under which the pile thread holder passes in column direction for the purpose of thus providing the corresponding thread guide channels row by row with pile yarn through the backing. Providing such a gripper station with parallel operation of a plurality of thread gripper systems can greatly increase the process speed for manufacturing a carpet tile when compared to a serial process.

Preferably further necessary under the pile thread holder and the backing is a plate (bottom plate) with recesses in which the pile yarns come to lie with their fixation part. The backing is in this way caught between the pile thread holder and the bottom plate so that it remains perfectly in place when the pile threads pass through the perforations of the backing.

In an advantageous embodiment a plurality of gripper stations can be placed in parallel, each provided with its own thread gripper systems for each thread guide channel of a whole row. A different type of yarn and/or colour of yarn can in this way be used at each gripper station and/or the pile height of the parallel gripper stations can be set differently. An individual control of the gripping pins makes it possible to choose, per unit of thread guide channel, whether or not a thread is inserted.

Once a gripper station has passed all the rows in order to optionally provide yarn from that station, in a possible embodiment the pile thread holder is displaced to a subsequent gripper station, wherein the rows are passed once again in order to optionally provide threadless thread guide channels with yarn from this second gripper station. The pile thread holder is then displaced to a third gripper station, and so on until all stations have been passed and the whole pile thread holder is filled with yarn in accordance with the pattern.

If the same yarn is used at different gripper stations, the filling of the thread guide channels can be spread over a plurality of gripper stations so that the speed of manufacture of carpet tiles can be greatly increased in accordance with the number of gripper stations.

In a possible embodiment the fixation part of the pile yarn comes to lie in the bottom plate by means of a mechanism with a gripping pin which grips and guides the fixation part of the thread through the thread guide channels and the backing and into the bottom plate. When the pin is retracted, the pile thread remains behind with the fixation part of the pile thread caught in the backing.

The gripping pin preferably performs a simple up and downward movement.

The backing is preferably perforated before the yarn is inserted. This facilitates the insertion of the pile yarn through the backing and avoids excess stresses in the backing.

The form and/or diameter of the perforations in the backing is preferably chosen such that the gripping pin can easily carry the yarn through the backing and also easily release it when the gripping pin is retracted. The fixation part of the thread has to remain attached in the backing here.

A second backing is preferably placed against the first backing so that all fixation parts of the pile threads come to lie between the two backings. The two backings can consist of the same material, such as for instance a non-woven, optionally laminated with a polyolefin with lower melting point. Different materials are possible as long as the first backing can be perforated and the two backings can be adhered to/fused with each other. Examples of first backings are needlefelt, spunbond, film, polyurethane, PP foam. Use can be made of different raw materials such as PP, PE, PES, PA. The primary and secondary backing are preferably each provided on one side with a layer having a lower melting point than the other part of the backing. The primary and secondary backing then come to lie with these layers against each other and fuse together with the fixation points of the pile yarn during pressing. Because the second backing is not perforated there is, depending on the application, a range of extra options. Thicker or harder backings can be chosen subject to the application. Combinations can in this way be made with other floor types, such as for instance cork, parquet, laminated flooring. Snap systems can thus also be applied here as connecting technique. Different types of backing and combinations of materials in backings are thus possible. For very special applications a third backing could even be arranged. For instance a backing with sensors and connection points which connect the different tiles to each other. Another example could be a backing which buffers heat. Heat is stored during the day and generated at night due to a change in the state of materials which could be present in the backing.

It has been found particularly with embodiments of the method according to this invention that the cut-pile tile has very great stability owing to this thermal pressing, whereby it is possible to use very thin backings. It is thus possible with this method to manufacture stable cut-pile tiles weighing up to half as much as tiles made with classical techniques. This results in an enormous saving in raw materials. It is furthermore possible to use materials from the same family (examples of material families can be the polyolefins; polyesters; biopolymers), for both the pile yarn and the backings. This provides the option of producing a cut-pile carpet which is up to 100% recyclable without separating materials.

The second backing is preferably pressed onto the first backing with heat and pressure. The fixation parts of the pile yarn are now caught and, depending on the choice of the raw materials, partially fused with and between the two backings. It is also possible in this way to work without adhesives. The heating can take place with a heated plate with resistors, although the fusing could also take place ultrasonically.

In a determined embodiment more than one pile thread can also be placed through a perforation of the backing. Depending on the thickness of the pile threads, a thread gripper system and gripping pin can carry more than one thread at a time through the thread guide channels. A higher pile density can hereby be obtained.

According to a possible embodiment, the pile thread is cut at the desired height. This height can be less than, equal to or more than the height of the pile thread holder.

In an alternative embodiment the pile thread is not carried all the way through the backing but the pile thread ends in (the thickness of) the backing itself, wherein the end is anchored in the backing using for instance adhesive.

In yet another embodiment the pile thread is anchored against or on the backing, for instance with an adhesive layer which is present there when the pile yarn is arranged.

In a determined embodiment different types of pile yarn are combined with each other on the same pile carpet tile.

In a determined embodiment the pile carpet tiles are used as wall tiles, for instance for insulation applications for sound and temperature, or decoratively.

In a determined embodiment the backing is porous, for instance water-permeable for outdoor applications.

In a determined embodiment the backing is laid on the upper side of the pile thread holder so as to thus manufacture a loop-pile carpet.

In a determined embodiment determined zones in the pile carpet tile are left empty so as to be provided later with a different type of filling.

The invention also relates to pile carpet or pile carpet tiles manufactured according to embodiments of the method of the invention as described above.

According to embodiments of the invention, a new type of cut-pile carpet (loose-laid and/or wall-to-wall) is developed consisting of cut-pile tiles manufactured according to this invention. The tiles are preferably attached to the floor (or wall or ceiling) with an adhesive or any other type of attaching means. This adhesive is preferably a pressure-sensitive adhesive (PSA). This allows the carpet to be reconfigured without the risk of adhesive residues remaining on the floor. Different types of adhesive are suitable for this purpose. Examples are adhesives based on PP or rubber or acrylate, etc. Determined adhesives can for instance be arranged as a hotmelt, others for instance with a roller. Both methods of application are easily possible during the single-step production process as described in this invention.

The cut-pile carpet obtained according to the method of the present invention comprises at least a primary backing in which cut pile yarn is arranged in V-shape. The fixation part of the pile yarn preferably protrudes on the underside of the primary backing and forms a flange after being pressed onto an optional secondary backing.

The edges of a cut-pile carpet tile are clean in the sense that no cut pile yarn or fixation parts can be discerned. The pile yarn is fixed in the preferably perforated backing in matrix or honeycomb form, or any other form.

The pile yarn is preferably implanted perpendicularly. There is thereby no production direction, and the tiles can be laid in different directions without causing a "chequerboard" appearance. This perpendicular pile position and the tensionless cutting realizes a more attractive and voluminous pile surface with a better resistance to wear.

The invention further relates to a device or apparatus for performing the method as described above.

Figure 2:
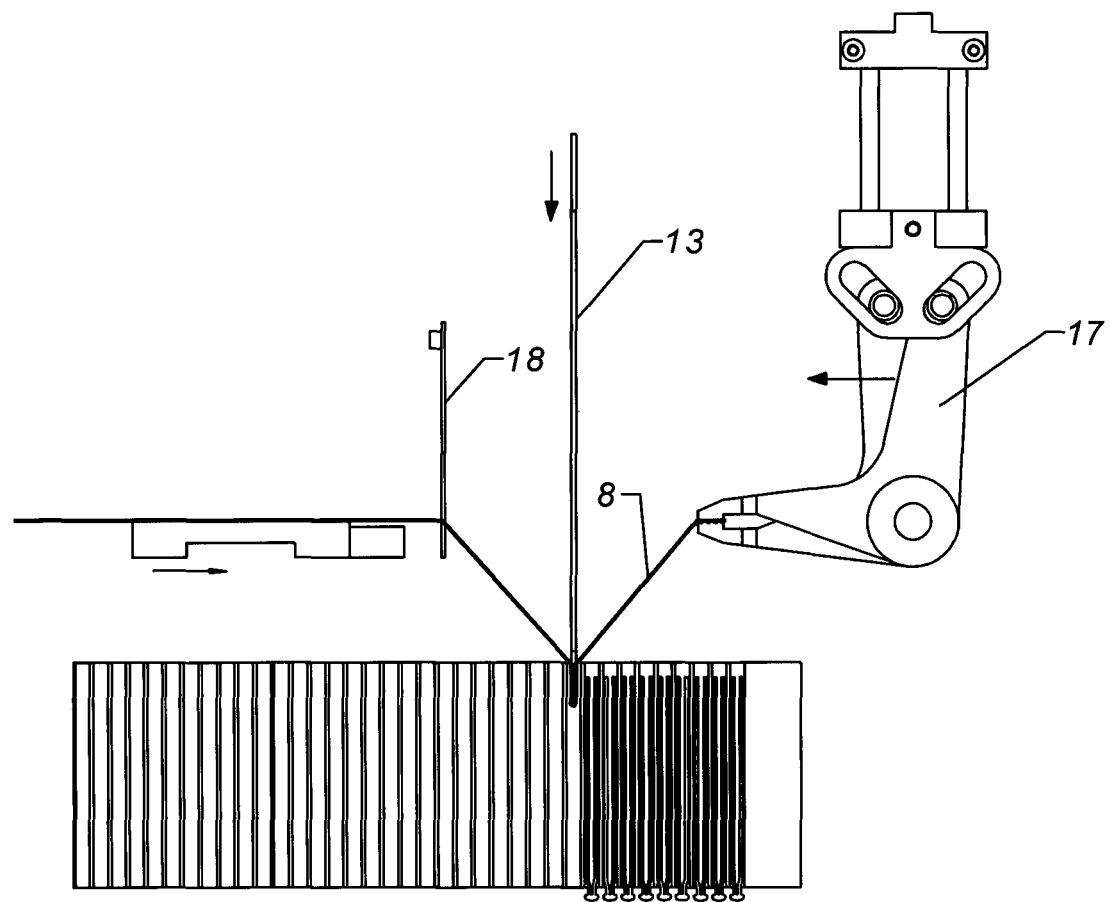

Other details and advantages of this method according to the invention and the device for performing such a method are further elucidated with reference to the accompanying figures, in which FIGS. 1 and 2 show cross-sections of two steps of an embodiment of the process for manufacturing cut-pile carpet tiles according to the invention, wherein detail B of FIG. 1 is a detail section of an embodiment of the underside of the pile thread holder and the (primary) backing.

FIGS. 1 and 2 illustrate an embodiment of a method and device for manufacturing a carpet tile according to the invention, comprising a flat pile thread holder 1 provided between a (primary) backing 7 on the one side and a gripping station 14 on the other side.

Pile thread holder 1 is provided with pile thread guide channels 2 which perforate from the one side 5 (of gripping station 14) of the pile thread holder to the other side 6 (of backing 7). Sides 5 and 6 of the pile thread holder are parallel, at a distance equal to the length of the pile thread guide channels 2. The pile thread guide channels 2 are preferably situated perpendicularly of the perforated sides 5 and 6 of the pile thread holder. The pile thread guide channels 2 are preferably provided in a matrix configuration in the surface of each side.

The advantage of such a configuration is that the carpet tile will hereby not have a production direction, as is the case in classical techniques such as weaving and tufting. This therefore means that the pile threads are implanted perpendicularly in the backing. When these carpet tiles are laid there is therefore no laying direction either, as is now always the case with tiles currently available on the market. There is a possible additional advantage in the case of artificial grass for sports fields. When the pile yarn is perfectly perpendicular, the rolling of the ball is the same in all directions. This is not the case in present grass sports fields, whereby the rolls of artificial grass are now always laid transversely across the sports fields. In the current artificial grass sports fields there is therefore a particular difference when the ball rolls from the left-hand side to the right-hand side of the sports field, and vice versa.

In another embodiment it may be the intention to obtain a decorative carpet with pile threads in different directions. In this context the pile thread guide channels 2 can be implanted in a direction other than perpendicular, or a combination of several directions. The gripping station therefore has to be adapted for this purpose to such an embodiment.

The pile thread holder 1 is preferably embodied in the form of one or more blocks in which the pile thread guide channels 2 are provided. In a determined embodiment the pile thread guide channels 2 can be drilled into a block of for instance steel, aluminum or plastic.

In another embodiment the pile thread holder 1 is formed by two perforated flat parts, for instance plates, the perforations of which correspond to each other. The pile thread guide channels 2 are imaginary channels here between a first and a second corresponding perforation. The parts can lie against each other or a distance can be created between the parts via spacers.

The thickness of pile thread holder 1, or the distance between first and second sides 5 and 6, depends on the application.

The matrix configuration of the perforations of the pile thread guide channels 2 preferably has a honeycomb-like composition, wherein the perforations of successive rows are offset by a half-pitch. In other words, the columns are not perpendicular to the rows. With this configuration the density of the pile threads can be increased compared to a matrix with rows and columns perpendicular to each other. In an alternative embodiment the configuration of the perforations can consist of a combination of patterns or compositions in order to obtain a desired combination of densities in the carpet tile.

In this embodiment the pile thread holder 1 is positioned with its second perforated side 6 against a backing 7, so with the side furthest removed from gripping station 14. Backing 7 is pre-perforated, the perforations of which are positioned so as to correspond to the pile thread guide channels 2. Perforations 4 of backing 7 are preferably smaller than the pile thread guide channels 2.

Backing 7 is supported by a bottom plate 15 (detail B of FIG. 1). Bottom plate 15 comprises recesses 11 at the position of the pile thread guide channels 2. Gripping station 14 comprises a plurality of pliers 17, pile yarn guides 19, gripping pins 13 and shears 18, in other words as many as there are perforations in a row of the pile thread holder 1.

The pile yarn guide 19 presents pile yarn 8 to pliers 17, which pulls pile yarn 8 to the desired length, after which gripping pin 13 engages the central part of pile yarn 8 in a downward movement and inserts it into the pile thread guide channel 2 situated under gripping pin 13.

As gripping pin 13 engages, the pile yarn guide 19 and pliers 17 move toward each other (see arrows in the figure). When pile yarn 8 is situated partly in the upper part of the pile thread guide channel 2 (see FIG. 2) it is cut to the desired length by shears 18. Such coordination makes cutting possible at a minimal tension.

Gripping pin 13 then pushes the cut pile yarn 8 further through the pile thread guide channel 2, through side 6 of the pile thread holder, and so into and through backing 7, after which gripping pin 13 is retracted in an upward movement out of the pile thread guide channel 2 and pile yarn 8 remains fixed in backing 7 and forms a flange 10 in bottom plate 15.

The cut pile threads (9, 12) are situated in the pile thread guide channels 2.

The pile yarn guide 19 will then once again present pile yarn 8 to pliers 17.

Once the pile thread holder 1 has been advanced one row 3 in a direction 16 at right angles to rows 3, the process can restart for the subsequent row. If the pile thread holder 1 has a honeycomb composition of perforations, the gripping station also advances a half-pitch.

Once the pile thread holder 1 has left gripping station 14 the bottom plate 15 is removed, after which the protruding pile thread ends 10 are pressed onto backing 7. A second backing is however preferably first arranged against first backing 7, after which the whole is compressed for the purpose of anchoring the pile threads 10 between the two backings. Pressing preferably takes place via a hot plate. A further layer of adhesive or anti-slip can optionally then be applied to for instance the underside of the tile during the same process.

The pile thread holder 1 is then removed and pile yarn 8 is released from the pile thread guide channels 2.

The carpet tile is finished here in a continuous single-step process which preferably also comprises of perforating the backing at the beginning of the cycle.

Gripping station 14 is then once again available for the production of a subsequent carpet tile.

Gripping pin 13 can take any form, as long as it is suitable for inserting and pressing pile yarn through a pile thread guide channel.

In an alternative embodiment use is made of a crochet hook (not shown in the figure) situated under the pile thread holder 1, and so also under backing 7. The crochet hook then first passes in an upward movement through backing 7 and through a pile thread guide channel 2 in order to grip pile yarn 8, and then pulls this pile yarn 8 in a downward direction through the pile thread guide channel 2 and through backing 7.

Instead of a crochet hook, use can be made in another embodiment of a double gripping pin consisting of a lower gripping pin (not shown in the figure) and an upper gripping pin 13. In an upward movement from below pile thread holder 1 the lower gripping pin comes to engage pile yarn 8 between lower and upper gripping pins 13. The two gripping pins with pile yarn 8 engaged therebetween then move in a downward movement through pile thread holder 1 and through backing 7. The engagement is then released and the upper gripping pin 13 moves back upward.

The invention claimed is:

1. Method for manufacturing pile carpet or pile carpet tiles, wherein a pile yarn is connected via a pile thread holder (1) to at least a primary backing, wherein the pile thread holder comprises a plurality of pile thread guide channels in a matrix-like configuration which perforate the pile thread holder through two opposite sides, wherein the pile thread holder is provided between a pile thread gripping station on a first perforated side and a primary backing on a second perforated side, and the pile yarn is arranged via the gripping station from the first perforated side through a pile thread guide channel to the second perforated side through the primary backing.

2. Method as claimed in claim 1, wherein the arranging of a pile yarn comprises the following steps of:
   a. bringing the pile yarn to length in the gripping station;
   b. inserting at least one pile yarn via the first perforated side into a part of a pile thread guide channel;
   c. cutting the pile yarn to the desired length;
   d. inserting the cut pile yarn further through the pile thread guide channel to the second perforated side; and
   e. inserting the pile thread further through the primary backing.

3. Method as claimed in claim 1, wherein the pile yarn is gripped in a part of the pile yarn brought to length using a gripping pin; and wherein
   the gripping pin first engages the pile yarn and then passes through the pile guide channel and the primary backing with the pile yarn.

4. Method as claimed in claim 1, wherein the pile yarn is gripped in a part of the pile yarn brought to length using a gripping pin, and wherein the gripping pin first passes through the backing and the pile guide channel, then engages the pile yarn and returns therewith through the pile guide channel and the primary backing.

5. Method as claimed in claim 1, wherein the pile yarn is cut to length with a shears when the pile yarn is located partially in the pile thread guide channel.

6. Method as claimed in claim 1, wherein the primary backing is pre-perforated with perforations corresponding to the perforations of the pile thread holder for the purpose of receiving the tip of the pile yarn.

7. Method as claimed in claim 1, wherein the primary backing is supported by a bottom plate which comprises recesses for receiving the tip of the pile yarn.

8. Method as claimed in claim 1, wherein a secondary backing is arranged against the primary backing, while the pile yarn is in the pile thread guide channels.

9. Method as claimed in claim 8, wherein fixation parts of the pile yarn are pressed between the primary backing and the secondary backing such that after pressing they have a flange form.

10. Method as claimed in claim 1, wherein the pile yarn is inserted in V-shape in the pile thread guide channels.

11. Pile carpet manufactured with the method as claimed in claim 1, comprising a perforated primary backing provided with an implanted V-pile yarn, wherein the V-pile yarn extends through the primary backing.

12. Pile carpet as claimed in claim 11, wherein a secondary backing is arranged on the primary backing, wherein fixation parts of the V-pile yarn are located between the primary and the secondary backing.

13. Pile carpet as claimed in claim 12, wherein the fixation parts of the pile yarn are pressed between the primary backing and the secondary backing such that after pressing they have a flange form.

14. Method for manufacturing pile carpet or pile carpet tiles, wherein a pile yarn is connected via a pile thread holder to at least a primary backing, wherein the pile thread holder comprises a plurality of pile thread guide channels in a matrix-like configuration which perforate the pile thread holder through a first side and a second side, wherein the pile thread holder is provided below a pile thread gripping station and a primary backing is arranged on the first side, and the pile yarn is arranged via the gripping station as a loop-pile through the primary backing from the first side through a pile thread guide channel to the second side.

15. Method as claimed in claim 14, wherein the pile yarn is gripped in a part of the pile yarn brought to length using a gripping pin; and wherein the gripping pin first engages the pile yarn and then passes through the pile guide channel and the primary backing with the pile yarn.

16. Method as claimed in claim 14, wherein the pile yarn is gripped in a part of the pile yarn brought to length using a gripping pin, and wherein the gripping pin first passes through the backing and the pile guide channel, then engages the pile yarn and returns therewith through the pile guide channel and the primary backing.

17. Method as claimed in claim 14, wherein the pile yarn is cut to length with a shears when the pile yarn is located partially in the pile thread guide channel.

18. Pile carpet manufactured with the method as claimed in claim 14, comprising a perforated primary backing provided with an implanted loop-pile yarn, wherein the loop-pile yarn extends through the primary backing.

19. Device for manufacturing pile carpet or pile carpet tiles, comprising
   a pile thread holder with a plurality of pile thread guide channels between a first side and a second side of the pile thread holder;
   a pile thread gripping station adapted to receive a primary backing on the second side and to arrange a pile thread as a V-pile from the first side through a pile thread guide channel through the primary backing provided on the second side; or adapted to receive a primary backing on the first side and to arrange a pile thread as a loop-pile through the primary backing and from the first side through a pile thread guide channel to the second side;
   a press adapted to press a secondary backing against the primary backing while the pile yarn is situated through the primary backing and in the pile thread holder.

* * * * *